United States Patent [19]

James et al.

[11] Patent Number: 5,092,102
[45] Date of Patent: Mar. 3, 1992

[54] ESCAPEMENT SYSTEM PARTICULARLY FOR PACKAGING APPARATUS

[75] Inventors: Robert C. James; Lloyd Kovacs; Matthew R. Lind, all of Sheboygan, Wis.

[73] Assignee: Hayssen Manufacturing Company, Sheboygan, Wis.

[21] Appl. No.: 652,129

[22] Filed: Feb. 7, 1991

[51] Int. Cl.⁵ .............. B65B 9/10; B65B 51/14; B65B 51/16; B65B 51/30
[52] U.S. Cl. .......................... 53/51; 53/550; 53/371.5; 53/371.6; 53/374.5; 53/374.6; 53/375.4; 156/436; 156/583.91
[58] Field of Search ............ 53/550, 371.5, 371.6, 53/372.4, 373.5, 374.5, 374.6, 450, 51; 198/345.3; 156/359, 436, 583.91; 219/388, 476

[56] References Cited

U.S. PATENT DOCUMENTS

| 3,943,683 | 3/1976 | Kovacs et al. | 53/550 X |
| 3,992,851 | 11/1976 | James et al. | 53/550 X |
| 4,249,364 | 2/1981 | Kawasaki et al. | 53/374.6 X |
| 4,305,240 | 12/1981 | Grevich et al. | 53/374.6 |
| 4,817,366 | 4/1989 | Konzal et al. | 53/374.5 X |
| 4,881,360 | 11/1989 | Konzal et al. | 53/371.6 X |

Primary Examiner—Horace M. Culver
Attorney, Agent, or Firm—Senniger, Powers, Leavitt & Roedel

[57] ABSTRACT

An escapement system in which units are movable by and with an endless conveyor in an endless path, and an escapement system is provided for retarding the units as they move through a part of their path, then releasing them; the system being incorporated in packaging apparatus in which the endless conveyor is a wheel and the units are sealing dies on the wheel.

22 Claims, 13 Drawing Sheets

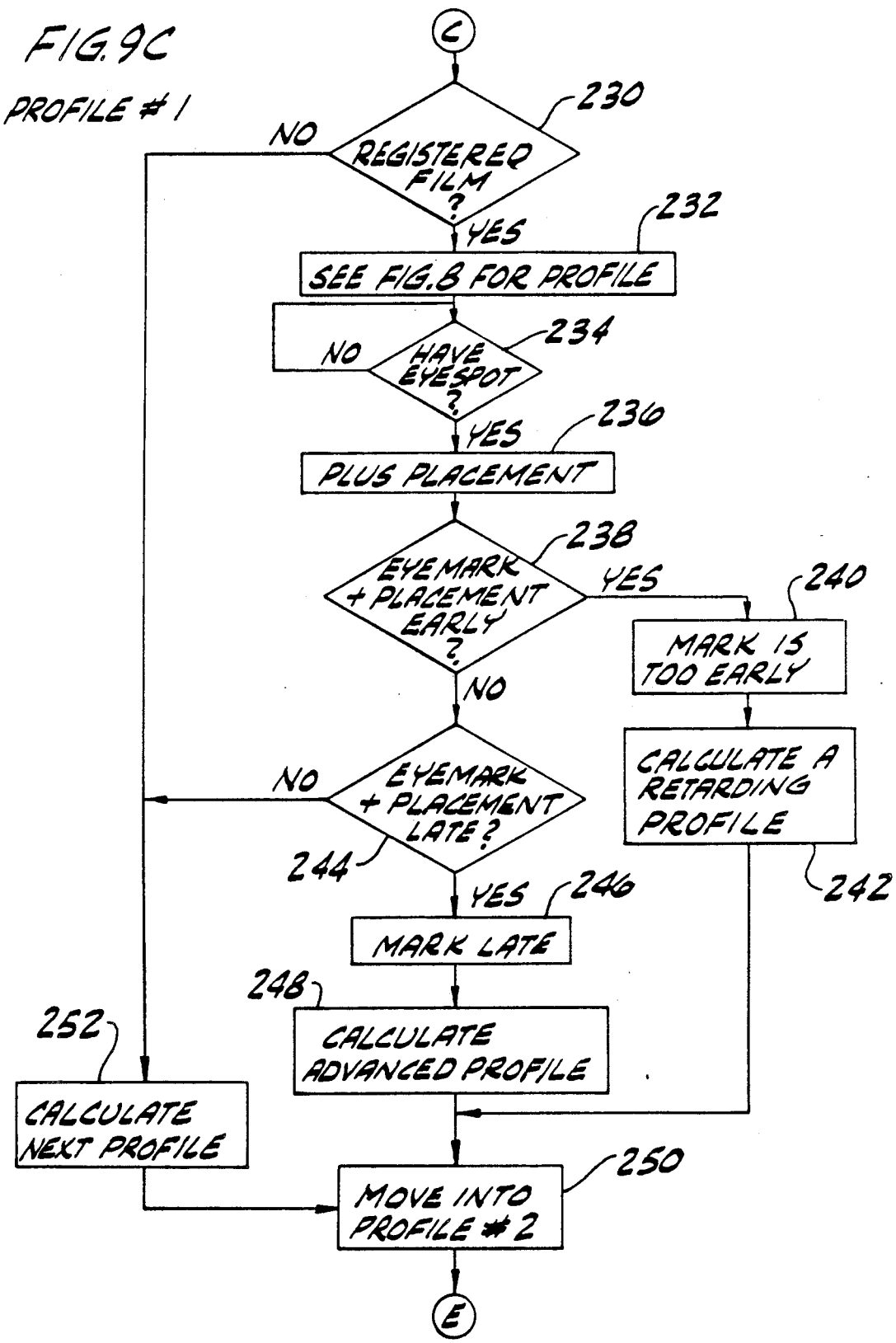

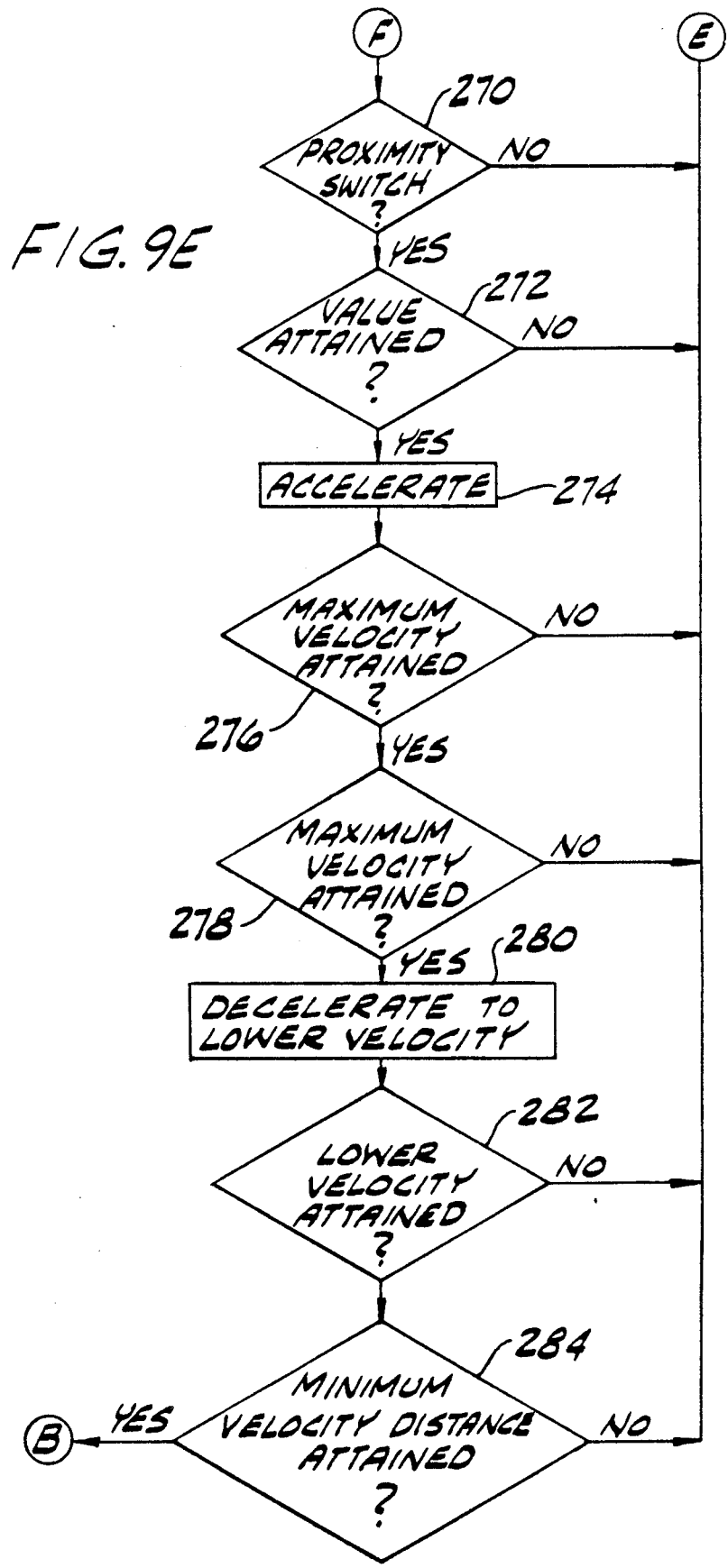

ESCAPEMENT SYSTEM PARTICULARLY FOR PACKAGING APPARATUS

BRIEF SUMMARY OF THE INVENTION

This invention relates generally to an escapement system for control of movement of units on a conveyor, and more particularly to packaging apparatus with the escapement system for packaging a product in a tubular bag having its ends sealed closed.

The invention is especially concerned with horizontal form-fill-seal packaging apparatus of the type shown in U.S. Pat. Nos. 3,942,304, 3,943,683, and 3,992,851 assigned to Hayssen Manufacturing Company of Sheboygan, Wisconsin in which apparatus items to be packaged are placed on a web at package length intervals, and the web is formed into a tube around the items and sealed and severed forward of and behind each item to form bags, each containing an item. In the apparatus shown in said prior patents, the entubed items pass around a so-called rotary turret or wheel. A plurality of clamping assemblies or die sealing units ("dies") are held stationary in a rest or hold position at one location on the wheel with the wheel rotating relative to the sealing units when the latter are in their hold position. In timed relation to movement of the portions of the tube between successive items therein, the sealing units are released one at a time from the hold position and are coupled to the wheel for being driven by the wheel. Each sealing unit or die has a fixed lower jaw and a hinged upper jaw swingable from an open to a closed position as the sealing unit moves from the hold position so as to clamp the tube between the jaws intermediate successive items in the tube. The jaws may be heated so as to heat-seal the tube transversely across the tube. Also, the jaws may carry a severing blade (or a heated wire) for severing the tube within the seal formed by the jaws thereby to form the trailing end seal of a leading bag and the leading end seal of a trailing bag. The jaws securely grip the web as the die moves with the wheel and thus pull the tube and products therein through the apparatus at the speed of the wheel. These three Hayssen patents relate to improvements upon the packaging apparatus shown in U.S. Pat. No. 2,976,657 to Cloud. Over 3000 machines of the type shown in the three Hayssen patents have been sold by Hayssen and it is believed that the vast majority of them are still in operation, and generally satisfactory in operation, having the advantages of enabling quick change from one size bag to another, and the long dwell time provided for sealing. But, until the present invention, these advantages have been offset to some extent because the production rate of these machines has been generally subject to a mechanical limitation of about 100 bags per minute, for example. This is because in the operation of the escapement mechanism of the apparatus, each sealing unit or sealing die comes to a dead stop at the hold position and is subsequently released to travel on with the wheel, succeeding dies coming to a dead stop again.

Accordingly, among the several objects of this invention may be noted the provision of packaging apparatus of the class described with an improved escapement system allowing for continuous travel of the dies, with a slow-down of the dies rather than a dead stop of the dies, at what corresponds to the holding position of the dies in the prior apparatus, thereby enabling a substantially higher rate of production of bags, e.g. 175 per minute or even more, with smooth die release.

The invention, while developed for the horizontal form-fill-seal packaging machine above-mentioned, may not be limited in application thereto, but may be applicable in general to other equipment having an escapement operating in timed relation to an endless conveyor (a wheel or endless chain conveyor or equivalent) carrying units to be held back by slowing them down and then releasing them to travel along with the conveyor at the speed of the conveyor to attain spacing of the units.

In general, apparatus of this invention comprises an endless conveyor, means for driving the conveyor, and a series of units carried by the conveyor for movement with and by the conveyor in forward direction in an endless path. Each unit is mounted on the conveyor by means which allows for movement of each unit in forward direction by the conveyor in unison with the conveyor at the speed of the conveyor through a first part of said endless path, and for movement of each unit by the conveyor at reduced speed relative to the conveyor at reduced speed relative to the conveyor through a second part of said endless path. Each unit is engageable in the course of its travel along its said endless path by means which is movable in forward direction at reduced speed relative to the conveyor for retarding the unit relative to the conveyor in said second part of its said endless path. The retarding means moves out of engagement with the unit at a point defining the forward end of said second part of the path of the unit, thereby releasing the unit to allow it to resume traveling at full speed for moving it away from the preceding unit.

With regard to packaging apparatus of the invention; which is operable for packaging items in flexible sheet packaging material by a form-fill-seal technique wherein the items are spaced longitudinally in a tube of said material, each of the stated units comprises a set of sealing jaws (a "sealing die"), the jaw of each set being movable relative to one another between an open and a closed position, each set being operable to seal the tube between successive items.

Other objects and features will be in part apparent and in part pointed out hereinafter.

BRIEF DESCRIPTION OF THE DRAWINGS

FIGS. 9A-9E are flow charts illustrating the operation of the microprocessor of the electronics for controlling the packaging apparatus of this invention.

Corresponding reference characters indicate corresponding parts throughout the several views of the drawings.

DETAILED DESCRIPTION

Figure 1:
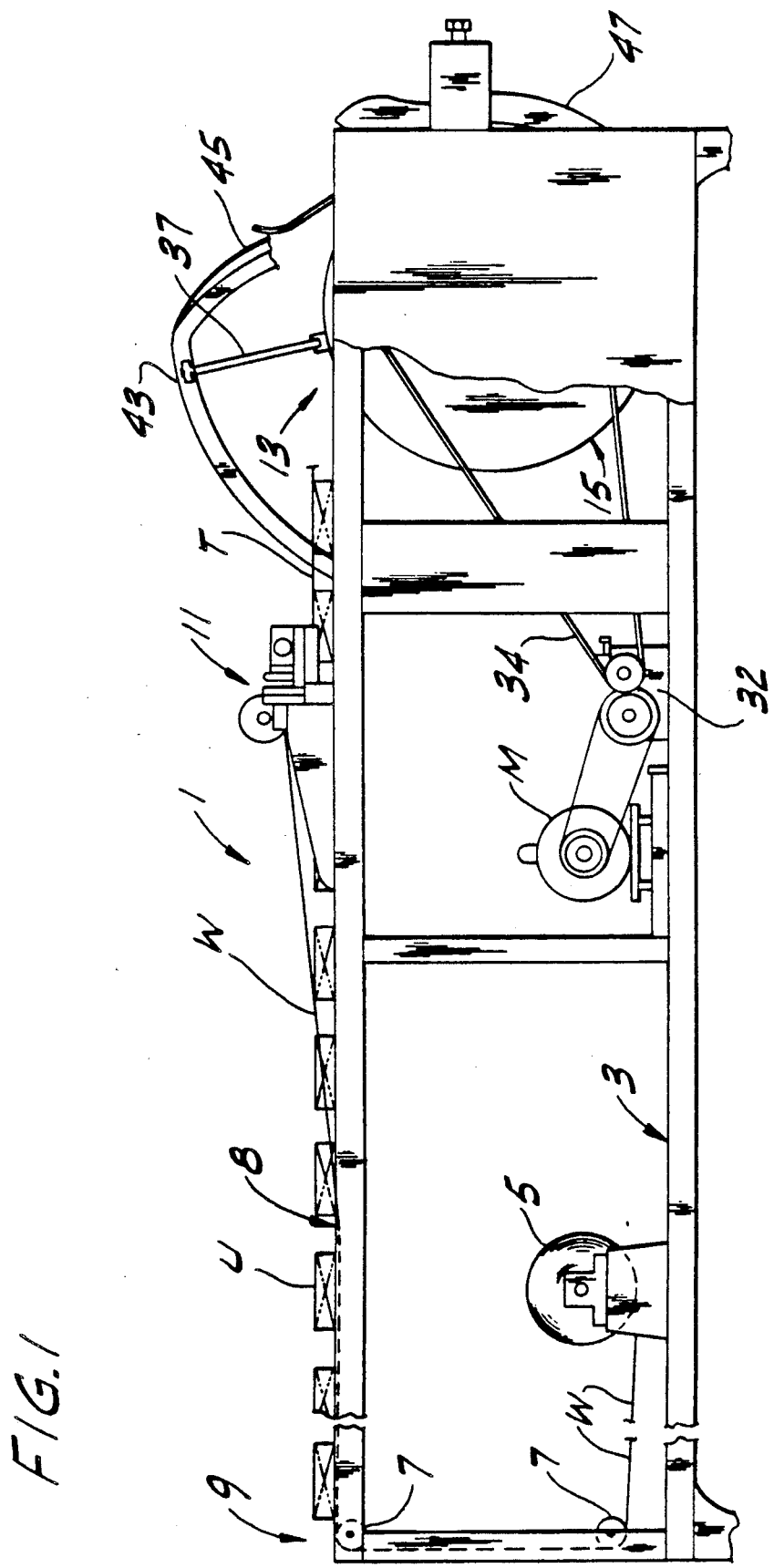
FIG. 1 is a simplified side elevation of packaging apparatus of this invention with parts broken away and other parts omitted to illustrate key components of the apparatus.
Figure 2:
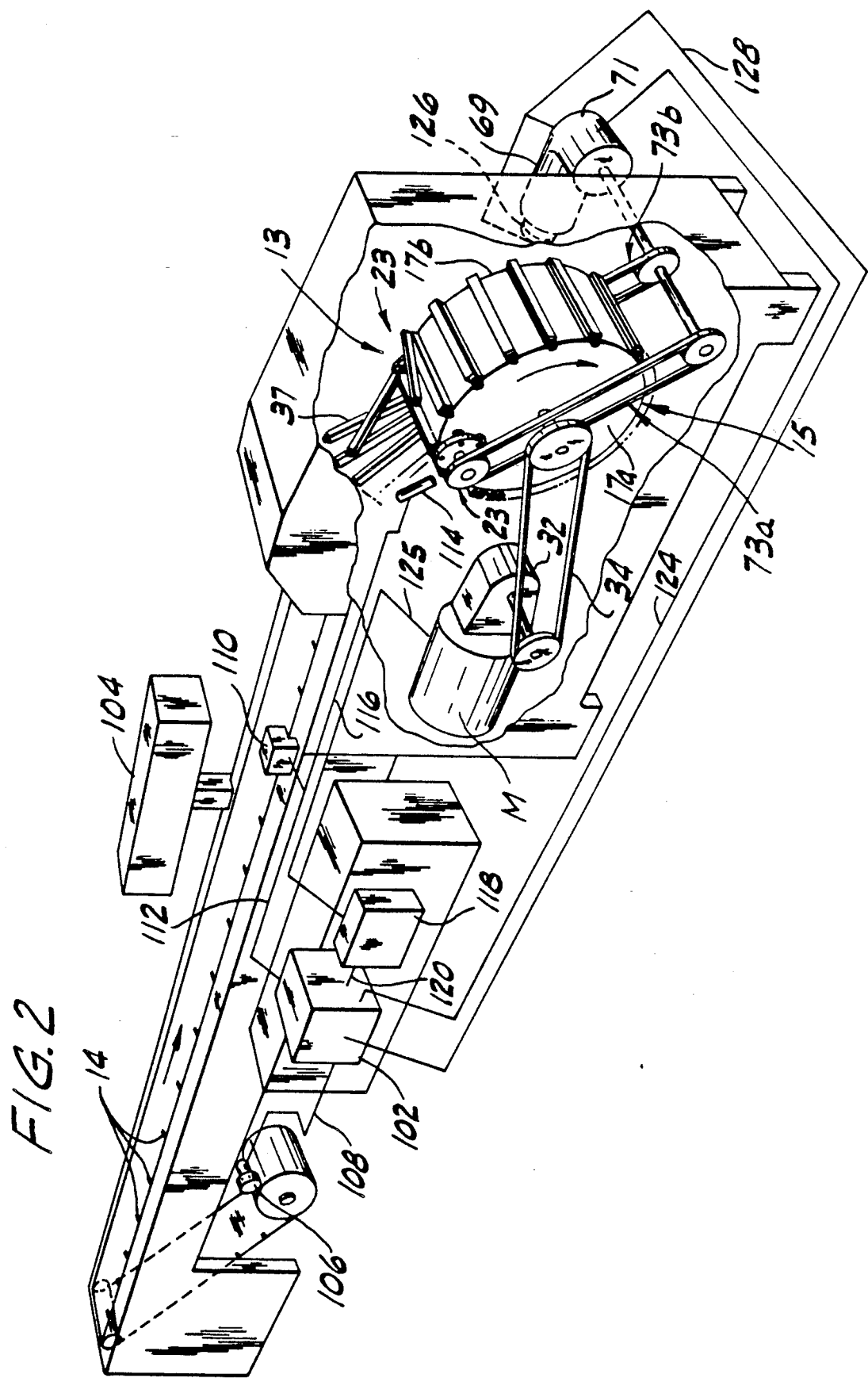
FIG. 2 is a semi-diagrammatic perspective of the FIG. 1 apparatus.

Referring now to the drawings, packaging apparatus 1 of this invention is shown to comprise a frame 3 for supporting a roll 5 of flexible web material W, such as heat-sealable plastic film, heat-sealable laminated sheet material, or the like. The web travels over rollers 7 along a path 8 through the apparatus. More particularly, web W moves past a loading station 9 at which point units U of product are fed onto the upper face of the web at substantially equal longitudinal intervals along the web by an infeed conveyor (not shown). As indicated at 11, means is provided along the path 8 for forming the web into a tube T surrounding the units or items U. This tube forming means folds up the side margins of the web on the items and forms a continuous longitudinal back seam joining the side margins of the web. The tube with the units U therein is moved along its path 8 toward means generally indicated at 13 for sealing and severing the tube between successive items U at package length intervals thereby to form a sealed bag around each item As shown in FIG. 2, the web W is pre-printed with registration marks ("eye spots") 14 spaced at package length intervals along its length. The apparatus may be operable on webs with or without such marks.

More particularly, sealing means 13 comprises a wheel 15 rotatable on a horizontal axis A and having two spaced, circular side plates 17a, 17b. The wheel, which in a given run may be driven at a predetermined speed by means comprising a motor M, carries a series of sealing jaw assemblies or units or "dies" each designated 19. Each unit 19 has means mounting it on the wheel for being conveyed around in a circular path by the wheel, which functions in this respect as an endless conveyor. The mounting means for each unit 19 includes means 21 (see FIGS. 3-6) for coupling it to both side plates of the wheel for travel with the wheel ("full speed" travel) and for uncoupling it from the wheel to allow the wheel to rotate relative to the unit 19 while the unit 19 is retarded (slowed down), as will appear. As shown in FIGS. 2, 3, 5 and 6, escapement means generally designated 23 (replacing the arresting means 23 shown in the U.S. Pat. No. 3,942,304) is provided for effecting retardation (slowing down) of a sealing unit 19 as it passes through a part 25 of its circular path of travel 20 without stopping it. This part 25 of said path may be referred to as the "retardation zone". Once it travels out of this zone, the unit 19 resumes traveling around with the wheel at full speed, and continues to do so until it butts against the trailing sealing unit of an accumulation of a number of the units which are retarded by reason of being restrained by that unit which is passing through the retardation zone 25 under control of the escapement means.

More particularly, wheel plates 17a, 17b are spaced apart a distance somewhat greater than the maximum width of product units or items U which can be packaged by apparatus 1. The plates are secured to a shaft 31 which is journalled by frame 3. Each side plate has a respective groove 33a, 33b in its inner face adjacent its periphery (see FIG. 4). Wheel 15 is rotatably driven by motor M via a speed reduces 32 and a timing feet and pulley drive 34.

Figure 3:
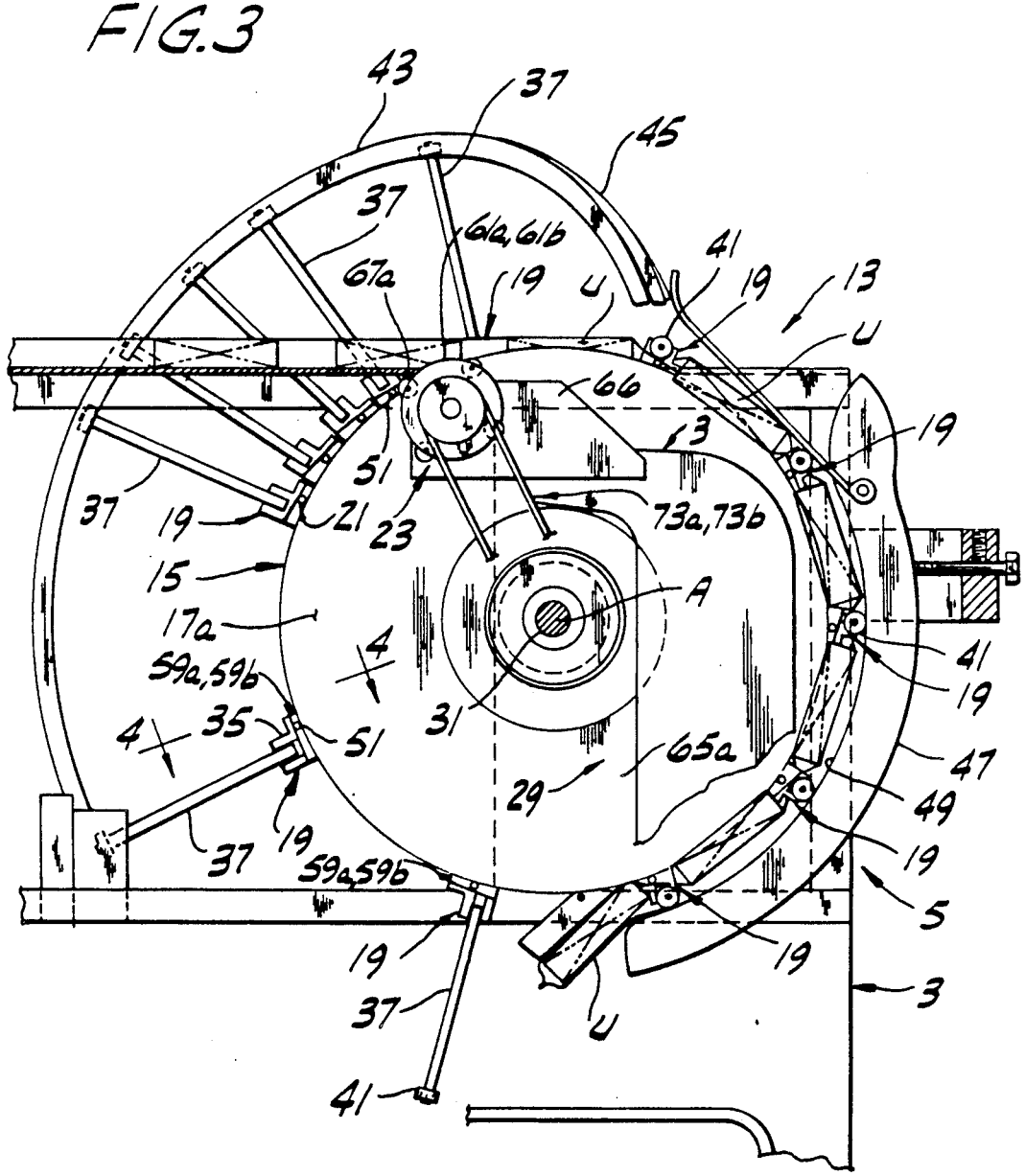
FIG. 3 is an enlarged view of a portion of the apparatus shown in FIG. 1 with some parts broken away illustrating a wheel, a series of sealing units (each comprising a set of sealing jaws) carried by the wheel for movement therewith and thereby in a circular path, and escapement means of the invention for retarding each sealing unit as it travels through a part of its said circular path which may be path which may be referred to as the zone of retardation.
Figure 4:
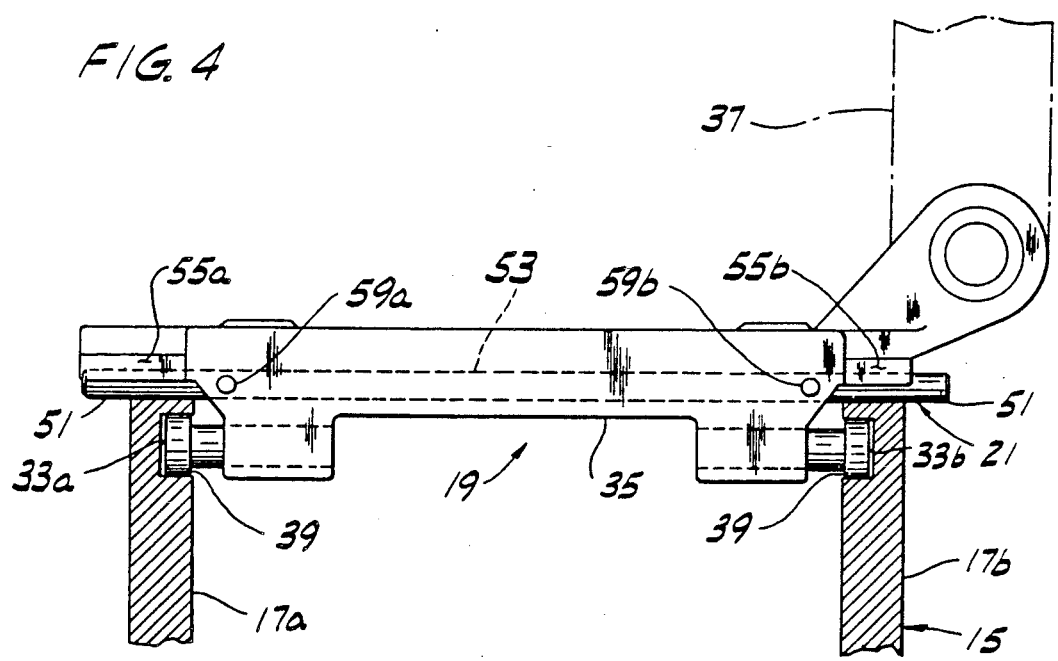
FIG. 4 is an enlarged vertical cross section taken on line 4—4 of FIG. 3 illustrating a sealing unit with its upper jaw (shown in phantom) in a raised or open position.

As best shown in FIG. 4, each sealing unit or die 19 includes a base 35 extending laterally between and beyond wheel plates 17a, 17b, this base constituting a fixed or lower sealing jaw and hingedly carrying an upper sealing jaw 37 swingable between an open position (e.g., the position of the upper jaw of sealing units 19 indicated in phantom in FIG. 4) and a closed position (e.g. the position of the upper jaws of sealing units at the right of wheel 15 in FIG. 3) in which the jaws clamp tube T therebetween. Each unit 19 may also be referred to as set 19 of jaws. As disclosed in the heretofore-mentioned U.S. Pat. No. 2,976,657, for example, the jaws may be heated for heat-sealing the tube and may carry blades (not shown) for severing the tube between successive product units U. With the set 19 of jaws closed and clamped on the tube and with the sealing units 19 positively coupled to the wheel 15, the sealing units pull web W and tube T along path 8 through the apparatus as the sealing units 19 rotate with the wheel through a sealing zone S. As shown in FIG. 3, more than one sealing unit grips the tube at any one time and thus the tube is continuously conveyed along its path 8 at substantially the surface speed of the sealing units 19 carried by wheel 15.

More particularly, base 35 of each sealing unit 15 has a pair of rollers at each side thereof, each of these rollers indicated at 39, received in grooves 33a, 33b in wheel plates 17a, 17b (see FIG. 4). These rollers transmit substantial clamping forces from the base to wheel 15 so as to establish a frictional drive connection between the wheel and the units 19 and also permit movement of wheel 15 relative to the sealing units (by slippage) when the latter are retarded in zone 25. A cam roller 41 (see FIG. 3) is carried by the outer end of movable jaw 37. These rollers are received in a guide track 43 to hold the jaws 37 open as the sealing units move around toward the top of the wheel. The guide track has a cam closing portion 45 which closes the jaws 37 of each sealing unit as the latter travels forward out of zone 25 toward sealing zone S. An arc-shaped pressure cam 47 is spaced from the outer periphery of wheel 15 and extends around a portion of the wheel, the length of this pressure cam 47 generally defining sealing zone S. The pressure cam has a cam surface 49 engageable with cam rollers 41 to firmly hold jaw 37 closed on its fixed jaw 35 thereby to positively grip tube T and to seal the tube as heretofore described. Upon exiting the pressure cam, the upper jaw is swung open by gravity (see FIG. 3) and the packaged unit U drops free of wheel 15 onto an outfeed conveyor (not shown).

Figure 5:
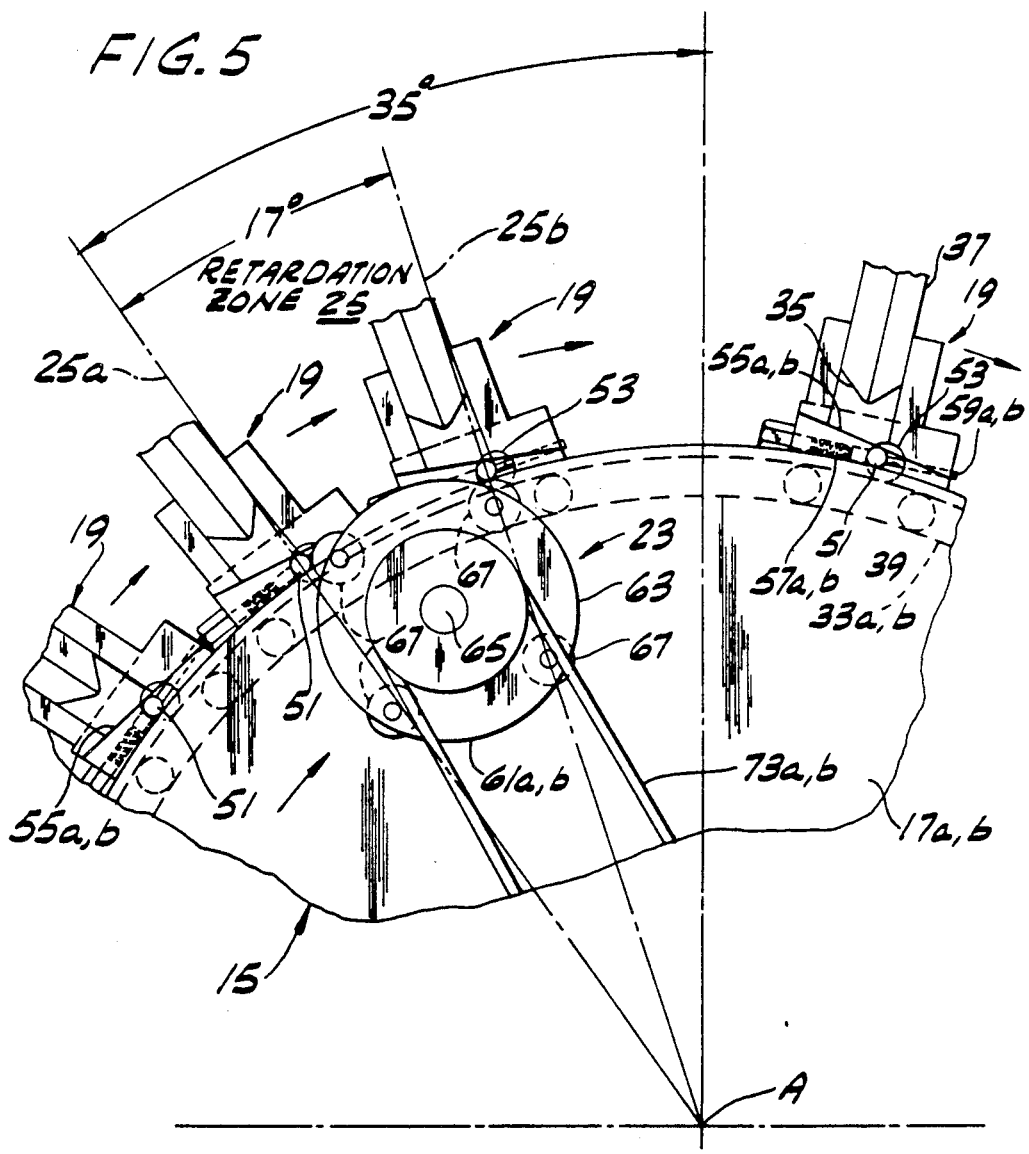
FIG. 5 is an enlarged fragment of FIG. 3 showing four consecutive sealing units in the series of sealing units with the first of the four (the leading unit of the four) spaced one package length interval from the second and moving forward at full speed, the second being released by the escapement mechanism, and the fourth butting up against the third.
Figure 6:
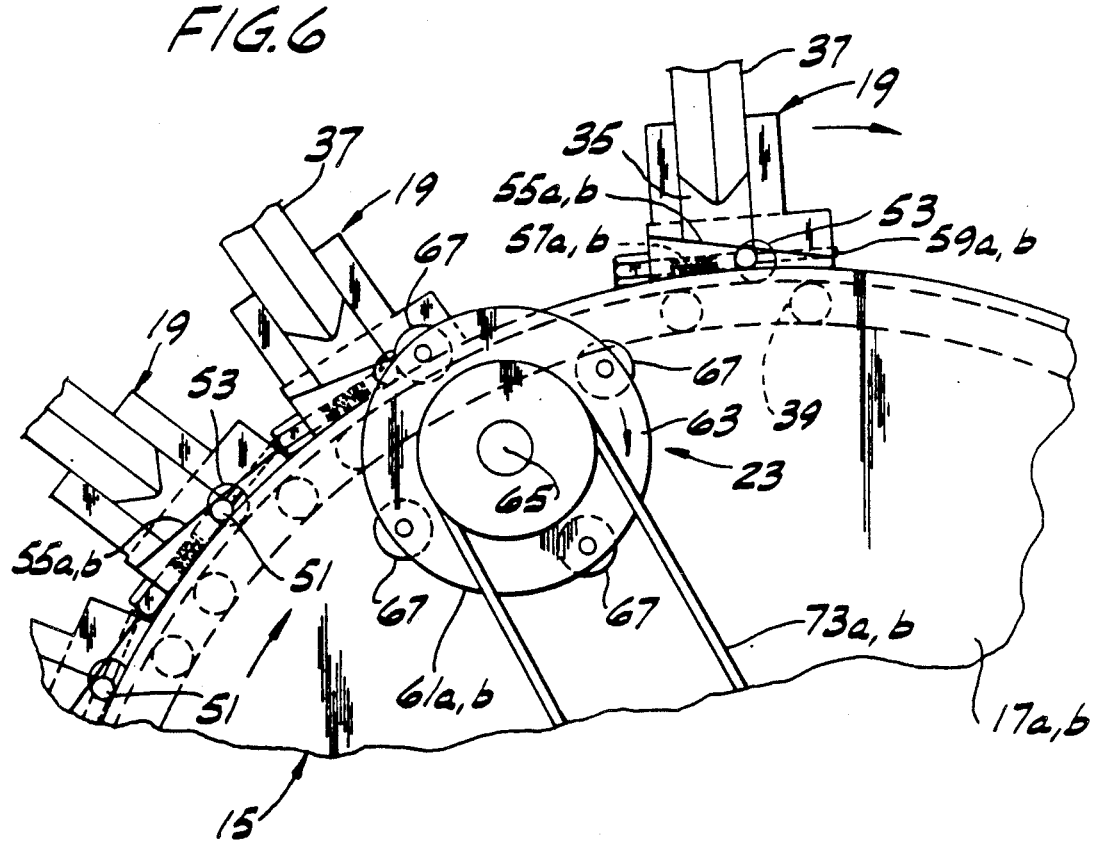
FIG. 6 is a view similar to FIG. 5 showing a moved position of parts, with what was the second of the jaw units shown in FIG. 5 moved away from what was the third, the third moving forward at a reduced speed under control of the escapement means, and what was the fourth butting up against what was the third.

As shown in FIGS. 4-6, each sealing unit base 35 has a coupling bar 51 extending laterally of the sealing unit out beyond the lateral ends of the sealing unit and beyond side plates 17a, 17b of wheel 15. This coupling bar is received within an enlarged bore 53 in base 35. At each side of base 35 an inclined ramp 55a, 55b is spaced radially outwardly of the outer peripheral surface of wheel plates 17a, 17b with the leading end of this inclined ramp surface in respect to the direction of movement of wheel 15 being spaced from the outer periphery of the wheel a distance somewhat less than the thickness (diameter) of coupling bar 51. A resilient flat spring such as indicated at 56a, 56b in the aforesaid U.S. Pat. No. 3,942,304 may be provided on the downwardly facing surface of respective ramps 55a and 55b for resiliently biasing end portions of the coupling bar into engagement with the outer peripheral surfaces of wheel side plates 17a, 17b. Compression coil springs 57a, 57b at opposite lateral ends of base 35 bias coupling bar 51 in the direction of rotation of the wheel toward a coupling position in which the coupling bar is wedged between the outer peripheral surfaces of wheel plates 17a, 17b and the flat springs thereby to lock the sealing unit to the wheel. The coupling bar is movable back against the bias of springs 57a, 57b to an uncoupled position in which the coupling bar is relatively clear of the peripheral surfaces of wheel plates 17a, 17b thereby to uncouple the sealing unit from the wheel. Coupling bar 51 carries a pair of interengagement pins 59a, 59b which are received in apertures in base 35 and which project out beyond the forward side of the base for interengagement with the next sealing unit forward which is retarded. Upon such interengagement, pins 59a, 59b move coupling bar 51 back from its coupled to its uncoupled position thereby to effect uncoupling of the sealing unit upon interengagement with the next unit forward.

The escapement means 23 for effecting the retardation (the slowing down without stopping) of the sealing units 19 as they move through the retardation zone 25 of their endless circular path of travel around with the wheel 15 comprises a pair of escapement wheels, namely a right-hand escapement wheel 61a and a left-hand escapement wheel 61b at the left hand and right hand sides of the wheel 15. These wheels which may also be referred to as "star wheels", are identical and coaxial, but oppositely arranged on opposite sides of the wheel 15, each comprising a disk 63 on the end of a stub shaft 65 mounted as indicated at 66 for rotation on a horizontal axis parallel to the axis of the wheel 15 with each disk in a plane parallel to and just outside the plane of the respective wheel side plate 17a, 17b. Each has a circular series of detents constituted by pins 67 on its face toward the wheel, four such pins being shown, spaced at 90° intervals. At 69 is indicated a motor operable through a speed reducer 71 and a pair of timer belt and pulley drives 73a, 73b for driving the disks. The axis of the disks 63 is so located and the radius of the pins 67 with respect to the axis is such that the pins travel in a circular path which is generally tangent to the circular path of travel of the end portions of the coupling bars 51 which extend over the wheel side plates 17a, 17b, for engagement of said end portions with the pins 67, as will appear. The escapement wheels 61a, 61b are driven in unison in the same direction as the wheel 15 (clockwise as viewed in FIGS. 5 and 6) so that as a sealing unit 19 travels forward in zone 25 (from left to right as viewed in FIGS. 5 and 6), the escapement pins 67 travel forward in this zone. And the escapement wheels are driven at such speed that as the pins 67 travel forward in zone 25 they travel at a lower speed than the sealing units 19.

The escapement wheels 61a, 61b are driven in such timed relation to the wheel 15 that as each sealing unit 19, coming around with the wheel 15, approaches the start 25a of zone 25 (its left end as viewed in FIGS. 5 and 6), a pin 67 on each escapement wheel comes up and around with the escapement wheel into the path of the respective projecting end portion of the coupling bar 51 of that sealing unit, and as the sealing unit continues to move forward, the end portions of the bar engage these pins. With the pins moving forward at a lower speed than the bar 51, the bar is shifted back to uncouple the sealing unit from the wheel 15. The sealing unit 19 continues to move in forward direction, but moves forward at reduced speed, more particularly the speed of the pins 67, relative to the wheel 15. Thus, the sealing unit 19 (the set of sealing jaws) is retarded relative to the wheel, retardation being permitted by the uncoupling of the sealing unit from the wheel and forward motion of the sealing unit continuing at the reduced speed as a result of the aforesaid frictional drive connection between the wheel 15 and the sealing unit.

As shown in FIG. 5, the stated pair of pins 67, (the one at the right and the one at the left) together constituting detent means come up and around into position for intercepting the ends of the coupling bar 51 of a sealing unit at the point 25a (defining the start of the retardation zone) about 35° rearward of the vertical plane 4 of the axis A of the wheel. The stated pair of pins 67 comes down and around and out of engagement with the ends of the coupling bar 51 of the sealing unit at 25b (defining the end of the retardation zone) about 18° rearward of said plane and about 17° forward of the start of the retardation zone (see FIG. 5); thus the retardation zone (as illustrated) extends for about 17° of arc. When the pins come down at the end 25b of the retardation zone 25, the ends of the coupling bars 51 are cleared for unrestricted forward movement, the bars 51 are sprung forward by the springs 57a, 57b for re-coupling the sealing unit to the wheel 15, and the sealing unit resumes its forward travel at the speed of the wheel and travels with the wheel at the speed of the wheel all the way around back to the point where it butts against the trailing unit 19 of the accumulation of units.

Figure 7:
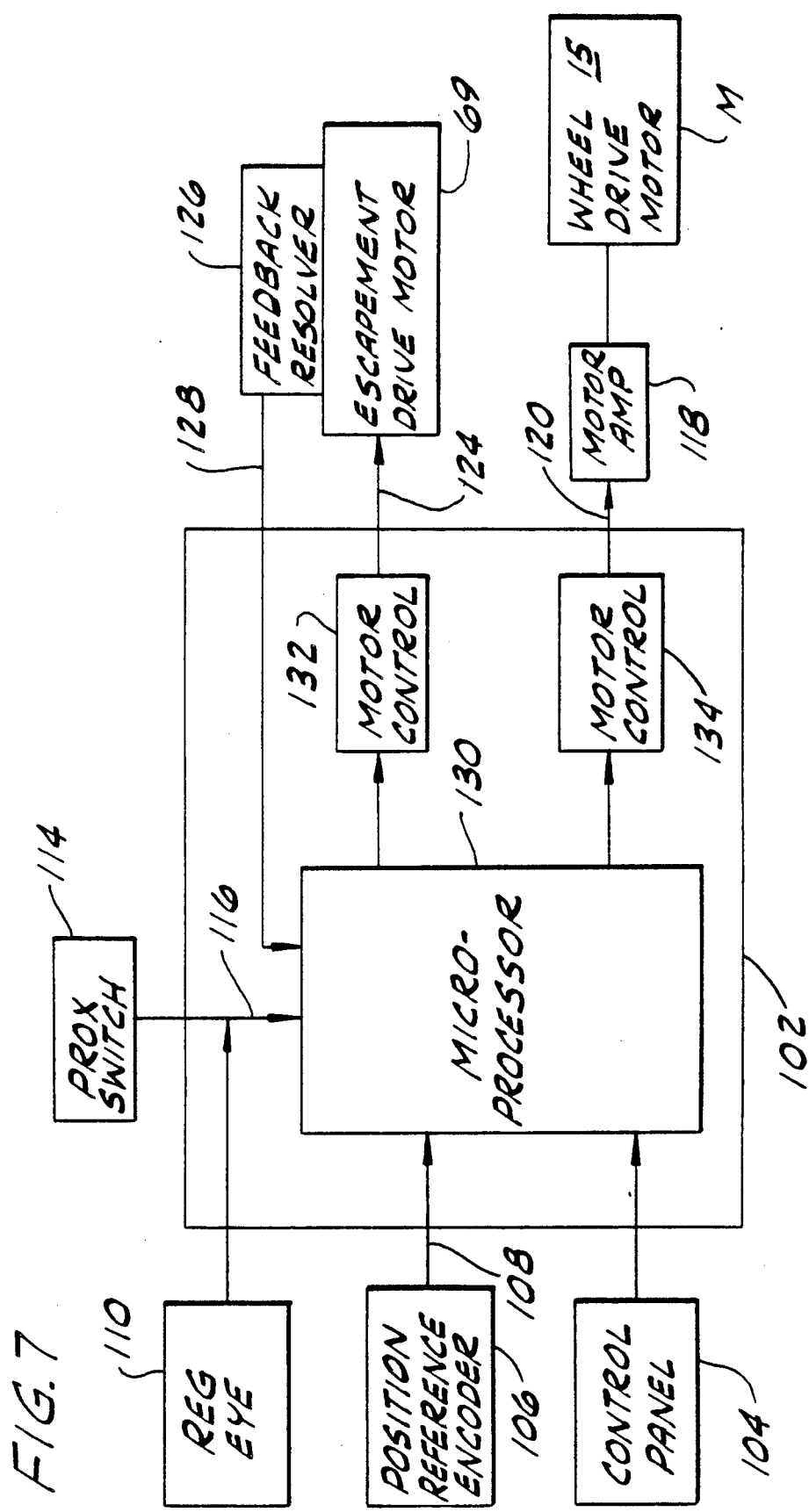
FIG. 7 is a block diagram of one preferred embodiment of the electronics for controlling the packaging apparatus of this invention.

Referring to FIGS. 2 and 7, the controls which determine machine operation will be described. Initially, an operator will determine the length of each bag to be made and the placement of the registration marks, if any. This determined bag length and registration placement is input into a controller 102 by the operator via a control panel 104. The speed ratio is then calculated by the controller 102 from the bag length and registration placement information. A position reference encoder 106 generates position or command pulses which are provided to the controller 102 via line 108. Generally, these pulses are generated at a rate of 12,500 lines per revolution per twelve inches of packaging material. These pulses permit controller 102 to determine the length of the packaging material or web W that is being drawn by the wheel 15 on a cycle. Controller 102 also receives signals from a registration eye 110, such as a photoelectric eye, which detects the registration marks or eye spots on the packaging material W. These signals are provided to the controller 102 via a line 112. In addition, controller 102 receives signals via line 116 from a proximity switch 114 adjacent one of the escapement wheels 61a, b, these signals indicating the home position of the escapement wheels.

In response to the signals received thereby, controller 102 outputs command signals to a motor amplifier 118 via line 120 and to the motor 69 via line 124. The control signal received by motor drive 118 and provided to the wheel drive motor M via line 125 to drive the wheel 15 at a speed entered by the operator via control panel 104 to controller 102. The command signals being provided to the escapement drive motor 69 via line 124 are related to the bag length, the registration placement and the sensor signals from encoder 106, registration eye 108 and proximity switch 114 being provided to controller 102, which control the speed at which the escapement means 23 is driven. Associated with the escapement drive motor 69 is a feedback resolver 126 which provides feedback signals via line 128 to controller 102. These feedback signals confirm the speed of operation of the escapement wheel.

As shown in FIG. 7, controller 102 includes a microprocessor 130 for receiving the signals from proximity switch 114, registration eye 110, position reference encoder 106, and control panel 104. In addition, microprocessor 130 receives the feedback signal from feedback resolver 126. In response to these signals, microprocessor 130 provides command signals to motor control 132 for controlling the escapement drive motor 69 via motor amplifier 134. In one preferred embodiment according to the invention, controller 102 comprises a two axes servocontrol system such as the INCOL/470 System, manufactured by MTS Systems Corp., Machine Controls Division, Eden Prairie, Minn.

Figure 8:
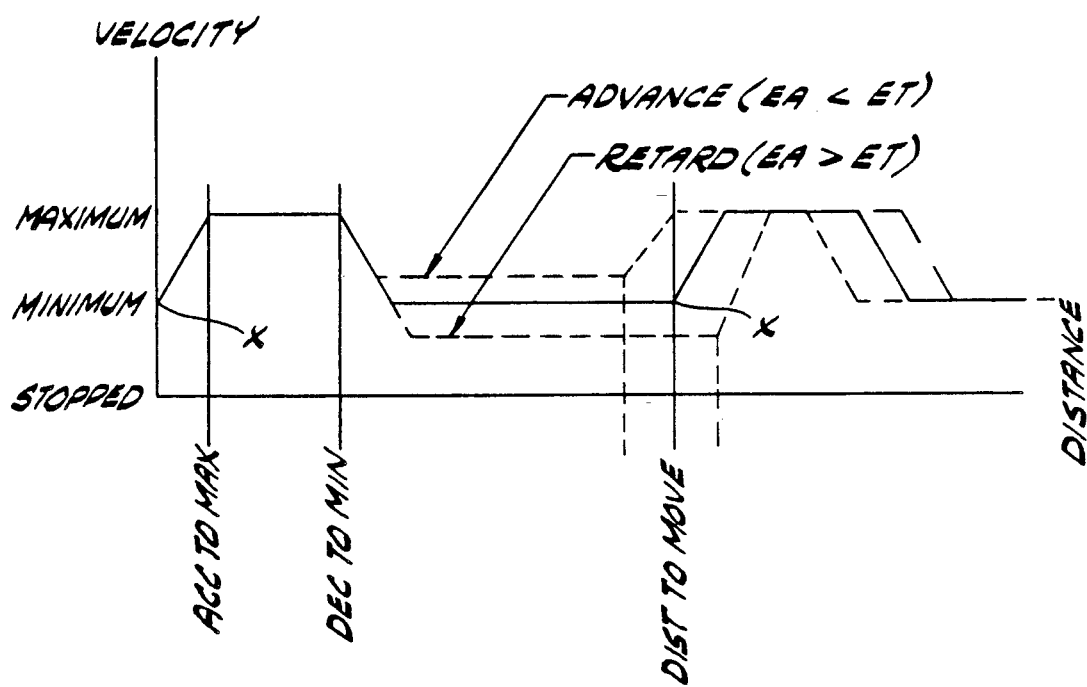
FIG. 8 is a timing graph of velocity along the ordinate and time along the abscissa illustrating one preferred embodiment of the profile of the speed of rotation of the escapement means of this invention.

With four pins 67 at 90° intervals on each of the escapement wheels 61a, b, these wheels may be regarded as operating through a cycle in each quarter revolution (four cycles per revolution. In each cycle, the speed of the wheels, and hence the speed of the pins, is varied from a maximum to a minimum and back to the maximum. As illustrated in FIG. 8, X indicates the end of one such cycle and the beginning of the next. The escapement wheel would be rotating at a slightly slower speed than the die wheel, and upon receiving an eyespot plus the placement offset, would accelerate away from the die releasing it. The velocity profile from one X to the next shows that the wheels (and pins) accelerate from a minimum velocity to a maximum velocity over a 10° period of rotation, rotate at a maximum velocity for about 20° of rotation, decelerate to the minimum (for retardation of the sets of jaws 19) in about the next 10° of rotation, and rotate at the minimum velocity for about the next 50° (90° in all). The profile is repeated every quarter revolution of the escapement wheels. As will be described in detail below, if the escapement means 23 is out of synchronization, its rotation is corrected by retarding or advancing the acceleration or deceleration as illustrated by the dashed lines in FIG. 8.

FIGS. 9A-9E illustrate a flowchart of the operation of the microprocessor 130 of controller 102 which coordinates the release of dies in response to detection of film registration marks 14 by the registration eye 110 and in response to the film velocity as indicated by the position reference encoder 106. Essentially, the system monitors the rate of film and the registration marks and adjusts the speed and phase of the escapement means 23 to be in synchronism therewith.

After powering up of the system at step 200, the operator enters the package length at step 202 and enters the registration placement at step 204 via the control panel 104. Microprocessor 130 calculates the second (next) profile for the escapement means 23 (wheels 61a, b) at step 206 and calculates the number of dies to be used at step 208. These wheels may be hereinafter referred to as "star wheels". The operator is informed of the number of dies to be used at step 210 by a display on the control panel 104. After installing the proper number of dies, the operator pushes the start button at step 212 to start the main drive at step 214, the infeeding at step 216 and the rotation of the star wheels at step 218.

Controller 102 will start the star wheels rotating at a coordinated velocity with the web W (hereinafter "film"). Position reference encoder 106 monitors the velocity of the film and supplies a pulse train used for the star wheel control rate. The controller 102 uses this pulse train as an input which is the time base for the star wheels because as the film speeds up and slows down, so does the pulse train.

Proximity switch 114 senses the home position of one of the pins 67 of the escapement wheel 61a. When this home position is sensed, controller 102 waits for a specific number of degrees and then, the controller 102 accelerates the star wheels for movement of the pin 67 engaged by the unit 19 (hereinafter "die") out of the way of the die to release the die. The controller 102 will maintain the wheels at their maximum speed for a specific number of degrees and then reduce the speed.

The position reference encoder 106 provides a pulse train which is driven by the film and used as a master clock. A predetermined delay or placement equal to a number of encoder clock pulses is calculated to represent the period between sensing of the registration mark by eye 110 and release of the die by the star wheels. This placement is the target error (Et) or the offset. The actual count (Ea) between each actual registration mark and die release is determined by controller 102. If the actual count is greater than the target error, then the slave profile of the star wheels is too early and must be retarded for proper synchronization, as shown by the dashed line labeled RETARD in FIG. 8. If the actual count is less than the target error, then the slave profile is too late and must be advanced to catch up with the film feed, as shown by the dashed line labeled ADVANCE in FIG. 8. The actual error in master pulses is:

$$E = Ea - Et$$

Figure 9A:
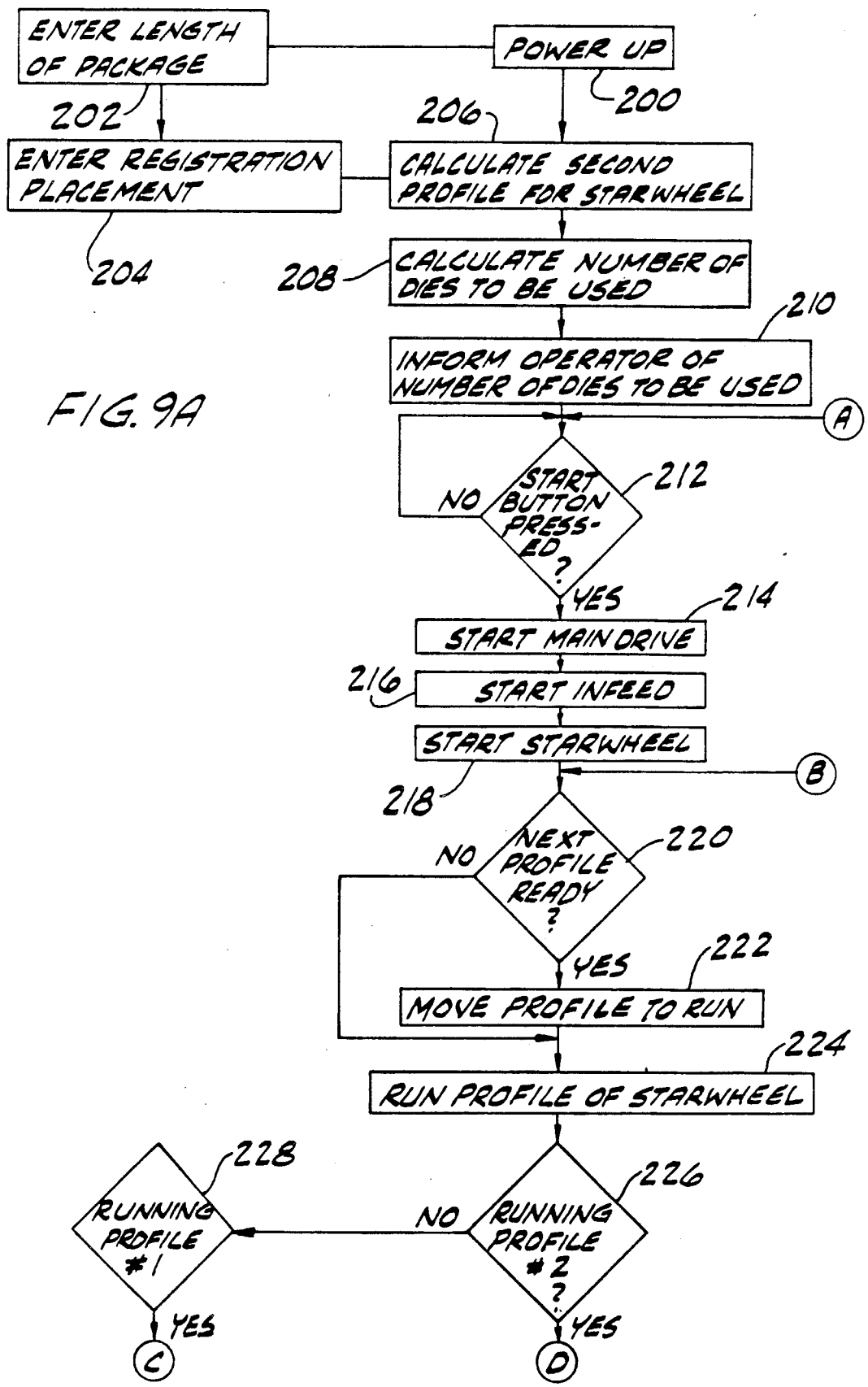
Figure 9B:
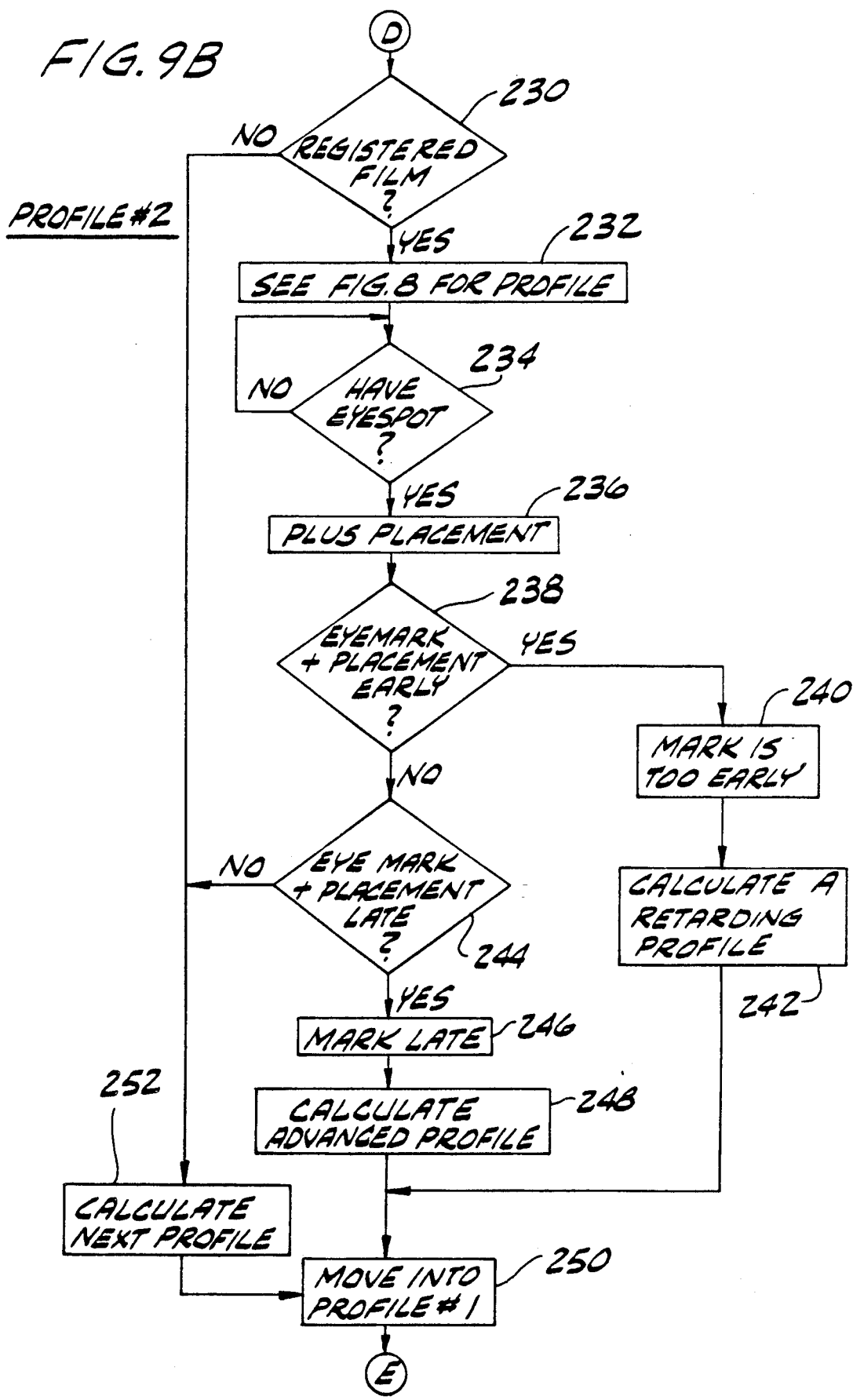

FIG. 9B illustrates the operation of profile 1 and FIG. 9C illustrates the operation of profile 2. These profiles are alternatively executed depending on the relative position between the actual count and the target error. Essentially, microprocessor 130 executes one profile while the other profile is being calculated, as will be explained in detail below. The next profile is calculated based on any actual error E and used to control the star wheels to release the next die. While this die is releasing, the control 102 will continue to monitor the actual error E, if any, during each release cycle and create a new profile to be used for release of the next die. While one star wheel profile is being executed, the next profile is being calculated and waiting to be called by the control element. This creates a cycle that will always allow one profile to be waiting and one to be running. The profile will consist of time for one cycle, total distance of one cycle, acceleration, time at match speed, velocity at match speed, acceleration or deceleration period, nominal velocity, time at nominal velocity, distance traveled during acceleration or deceleration, distance traveled at matched speed and distance traveled at nominal velocity.

Referring back to FIG. 9A, after starting the star wheels at step 218, the microprocessor 130 is ready for the next profile at step 220. Initially, the microprocessor will default to a profile which will have no error correction and will be calculated on the information entered by the operator. Step 224 begins the running of the star wheel profile. If it is determined at step 226 that profile number 2 will be run, the microprocessor 130 executes the subroutine illustrated in FIG. 9B. Otherwise, step 228 determines the running of profile number 1 which is the subroutine as illustrated in FIG. 9C.

As both subroutines of FIGS. 9B and 9C are the same, they will be described simultaneously using the same reference characters. If an unregistered film (no eye marks) is being used, step 230 bypasses these subroutines and proceeds to step 252. Assuming a registered film (with eye marks) is being used, step 232 executes the speed profile illustrated in FIG. 8. After detection of an eye spot (mark) at step 234, the star wheels are allowed to rotate for the additional placement period at step 236. If the eye mark plus placement is earlier than calculated by step 238, step 240 determines that the mark is too early and calculates the next profile at step 242 to retard the timing so that proper synchronization will be maintained. Alternatively, if the eye mark plus placement is later than calculated at step 244, the eye mark is too late as determined by step 246 and microprocessor 130 calculates an advance profile at step 248 to maintain proper synchronization. The microprocessor 130 then prepares to run the next profile at step 250. If the actual eye spot plus placement is in synchronization, the microprocessor 130 proceeds from step 244 directly to calculate the next profile at step 252 and then prepares to run the next profile at step 250.

Figure 9D:
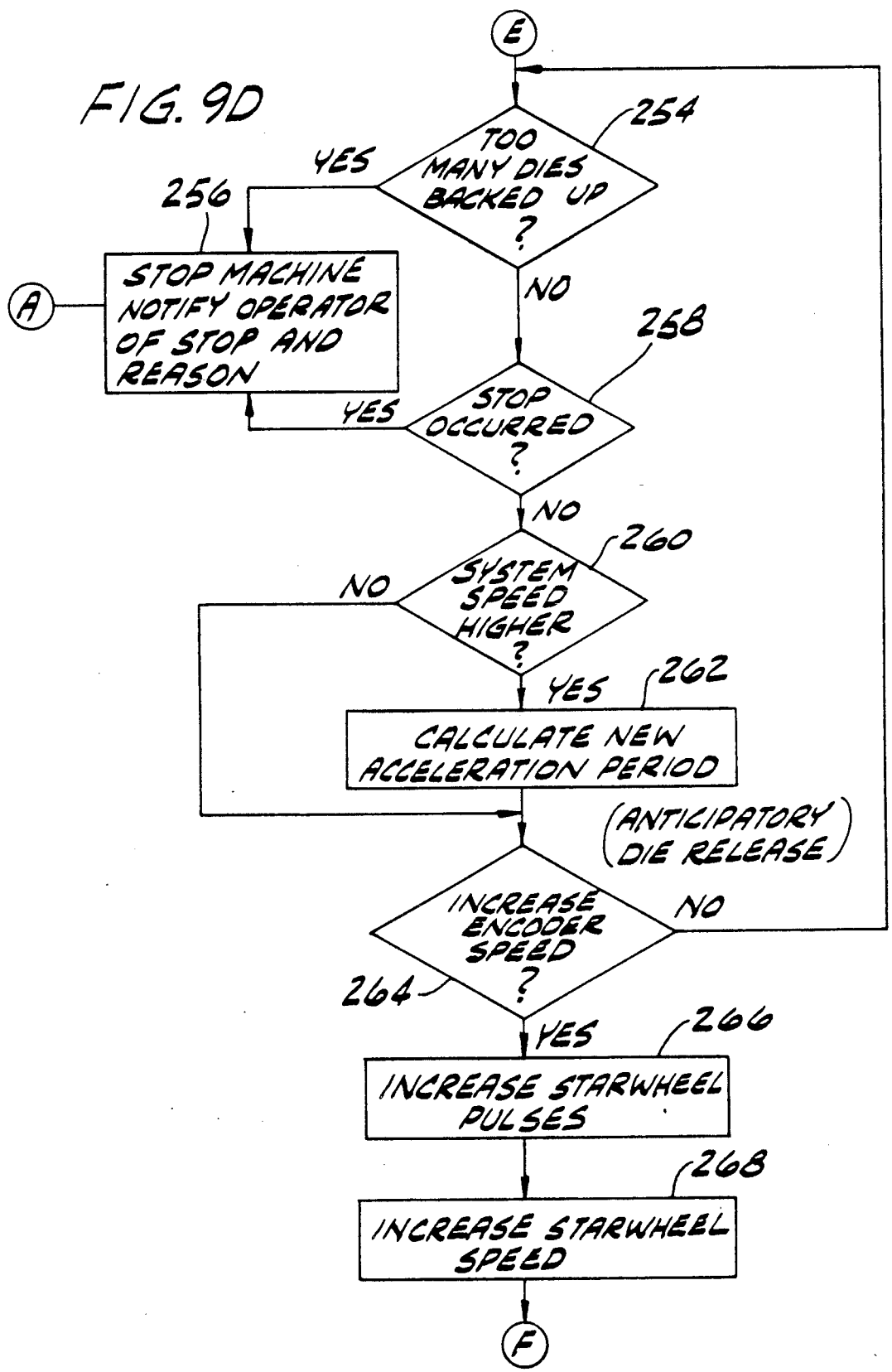

After executing each profile, microprocessor 130 executes the subroutine illustrated in FIG. 9D followed by the subroutine of FIG. 9E. If the microprocessor 130 determines at step 254 that too many dies are backed up(accumulated), the machine is stopped by step 256. Alternatively, if the microprocessor determines that some other stop condition, such as loss of eye spot, has occurred at step 258, the machine is stopped at step 256. If step 260 determines that the system speed is higher than the previous execution of this subroutine, step 262 is executed to calculate a new maximum velocity, i.e., a new acceleration point to anticipate the die release. Otherwise, the microprocessor 130 proceeds to step 264 considering whether the film encoder has increased in speed. If the encoder speed has not increased, the microprocessor 130 returns to step 254. If the encoder speed has increased, the microprocessor 130 executes step 266 to increase the pulse train to the star wheels thereby increasing the wheel rotational speed at step 268.

Referring to FIG. 9E, the subroutine therein considers various conditions. If these conditions are not met, the subroutine returns to step 254. As each condition step is met, the subroutine proceeds to the next step until all condition steps have been met, in which case the subroutine proceeds to step 220 to be ready for the next profile.

In particular, step 270 waits for the indication from the proximity switch 114 that the star wheels have reached home position. The microprocessor 130 then proceeds to step 272 to wait until the calculated value has been attained. The microprocessor 130 then proceeds to step 274 to accelerate the wheels until the maximum velocity has been attained as determined by step 276. When the distance at maximum velocity has been attained at step 278, the wheels are decelerated to the minimum velocity point by step 280. When the minimum velocity point has been attained as determined by step 282, the process proceeds to step 284 until the minimum velocity distance has been attained at which point the process returns to step 220 to be ready for the next profile.

In each cycle of operation as aforesaid, one set of pins 67 comes around and down at the maximum velocity out of engagement with the bar 51 of the die 19 at the end of the retardation zone 25 for smooth release of the die and the next successive set of pins comes around and up at the maximum velocity into position for engagement by the bar 51 of the following die 19. The released die is moved forward with and by the wheel 15, and is subsequently closed on the tube T between two product units U for forming the trailing seal of one package and the leading seal of the next package and for pulling the tube T forward. The following die is retarded by the next successive sets of pins on the star wheels so that the said released die moves (at the speed of wheel 15) away from the die (the retarded die). When the said released die has moved forward one package length, the next successive die is released, and is ultimately closed to form the trailing seal of said next package and the leading seal of the next package. Each set of pins 67 is accelerated for its downward movement clear of the bar 51 of each die for rapidly getting out of the way of the bar 51 and the next trailing set of pins is accelerated to the maximum velocity for quickly intercepting the next die. Then the pins are decelerated to the minimum velocity for their retardation in the retardation zone 25 for the stated spacing of a die from the preceding die for the formation of the packages. The velocity of the pins as they move forward through the retardation zone (their minimum velocity) is lower than the speed of the wheel 15 and the velocity of the pins as they move down at the end of the retardation zone and up at the start of this zone (their maximum velocity) may be higher than the velocity of the wheel 15. With the dies being retarded in the retardation zone, instead of being stopped as in the prior machines, operation is quite smooth and less noisy; the dies which accumulate at the top of wheel 15 do not bang one on another. This enables higher production rates.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Apparatus comprising:
an endless conveyor;
means for driving the conveyor;

a series of units carried by the conveyor for movement with and by the conveyor in forward direction in an endless path;

means mounting each unit on the conveyor for said forward movement of the unit with and by the conveyor through said endless path, said mounting means allowing for movement of each unit in forward direction by the conveyor in unison with the conveyor at the speed of the conveyor through a first part of said endless path, and for movement of each unit by the conveyor at reduced speed relative to the conveyor through a second part of said path, and means engageable by each unit in the course of its travel along said path and movable in forward direction at reduced speed relative to the conveyor for retarding the unit relative to the conveyor while allowing it to be moved forward by the conveyor in said second part of said path, said retarding means moving out of engagement with the unit at a point defining the forward end of the second part of said path thereby allowing the unit to resume travelling at the speed of the conveyor for moving said unit away from the preceding unit.

2. Apparatus as set forth in claim 1 wherein said retarding means comprises escapement means having a series of members engageable by the units, said members being movable in an endless path, and means for driving said escapement means for moving said members in their said endless path at said reduced speed in said second part of said path, each member coming into position for engagement by a unit at a first point defining the start of said second part of said path of the unit, travelling forward at said reduced speed, and then moving out of position for engagement by the unit at a second point defining the end of said second part of the path of the unit.

3. Apparatus as set forth in claim 2 wherein said escapement means comprises wheel means having a series of pins thereon spaced at intervals therearound constituting said members.

4. Apparatus as set forth in claim 3 having means for controlling the driving means for said escapement means so that it moves at relatively high speed as each of said pins moves into position for engagement by a unit at the start of said second part of said path, at relatively low speed as each pin moves away from the start of said second part of said path with the unit in engagement therewith for retarding the unit, and at relatively high speed as each pin moves out of engagement with the unit at the forward end of said second part of said path.

5. Apparatus as set forth in claim 2 having means for controlling the driving means for said escapement means so that the escapement means moves at relatively high speed as each of said members moves into position for engagement by a unit at the start of said second part of said path, at relatively low speed as it moves away from the start of said second part of said path with the unit in engagement therewith for retarding the unit, and at relatively high speed as it moves out of engagement with the unit at the forward end of said second part of said path.

6. Apparatus as set forth in claim 2 further comprising:

means for sensing the position of said members of the escapement means relative to its endless path;

means for indicating the position of the endless conveyor relative to the escapement means; and means for controlling said escapement means in response to the sensed position of said members as compared to the indicated position of the endless conveyor.

7. Apparatus as set forth in claim 6 wherein the means for driving the escapement means comprises a motor, and the apparatus has a feedback resolver for indicating the speed of said escapement drive motor and said controlling means is responsive to the feedback resolver and controls the speed of said escapement drive motor.

8. Apparatus as set forth in claim 1 having means for driving said retarding means and controlling its speed so that it moves at relatively high speed into position for engagement by a unit at the start of said second part of said path, at relatively low speed as it moves away from the start of said second part of said path with the unit in engagement therewith for retarding the unit, and at relatively high speed as it moves out of engagement with the unit at the forward end of said second part of said path.

9. Apparatus as set forth in claim 1 for packaging items in flexible sheet material, the items being spaced longitudinally in a tube of said material, wherein each of said units comprises a set of sealing jaws, the jaws of each set being movable relative to one another between an open and a closed position, each set being operable to seal the tube between successive items.

10. Apparatus as set forth in claim 9 wherein the endless conveyor comprises a wheel rotatable on a generally horizontal axis.

11. Apparatus as set forth in claim 10 wherein each set of sealing jaws comprises a first jaw mounted on the periphery of the wheel with a frictional connection therebetween for being driven by the wheel while enabling slippage between the first jaw and the conveyor as the set of jaws is retarded.

12. Apparatus as set forth in claim 11 further having means for positively coupling the first jaw of each set of jaws to the wheel for travel of the set with the wheel at the speed of the wheel and uncoupling the fixed jaw from the wheel as it travels through said second part of said path.

13. Apparatus as set forth in claim 10 wherein said retarding means comprises escapement mean having a series of members engageable by the sets of jaws, said members being movable in an endless path, and means for driving said escapement means for moving said members in their said endless path at said reduced speed in said second part of said path, each member coming into position for engagement by a set of jaws at a first point defining the start of said second part of said path of the unit, travelling forward at said reduced speed, and then moving out of position for engagement by the set of jaws at a second point defining the end of said second part of the path of the unit.

14. Apparatus as set forth in claim 13 wherein said escapement means comprises a pair of escapement wheels, one at each side of said jaw-carrying wheel, each escapement wheel having a series of pins spaced at intervals therearound constituting said members.

15. Apparatus as set forth in claim 14 having means for controlling the driving means for said escapement means so that it moves at relatively high speed as each of said pins moves into position for engagement by a set of jaws at the start of said second part of said path, at relatively low speed as each pin moves away from the start of said second part of said path with said set of jaws in engagement therewith for retarding said set of jaws, and at relatively high speed as each pin moves out of engagement with the set of jaws at the forward end of said second part of said path.

16. Apparatus as set forth in claim 13 having means for controlling the driving means for said escapement means so that it moves at relatively high speed as each of said members moves into position for engagement by a set of jaws at the start of said second part of said path, at relatively low speed as it moves away from the start of said second part of said path with said set of jaws in engagement therewith for retarding the set of jaws, and at relatively high speed as it moves out of engagement with the set of jaws at the forward end of said second part of said path.

17. Apparatus as set forth in claim 13 further comprising:
means for sensing the position of said members of the escapement means relative to its endless path;
means for indicating the position of the wheel relative to the escapement means; and
means for controlling said escapement means in response to the sensed position of said members as compared to the indicated position of the wheel.

18. Apparatus as set forth in claim 17 further comprising means for detecting registration marks on the packaging material and wherein the controlling means is responsive to the detected registration marks.

19. Apparatus as set forth in claim 18 wherein the means for driving the escapement means comprises a motor, and the apparatus has a feedback resolver for indicating the speed of said escapement drive motor and said controlling means is responsive to the feedback resolver and controls the speed of said escapement drive motor.

20. Apparatus as set forth in claim 10 having means for driving said retarding means and controlling its speed so that it moves at relatively high speed into position for engagement by a set of jaws at the start of said second part of said path, at relatively low speed as it moves away from the start of said second part of said path with the set of jaws in engagement therewith for retarding said set of jaws, and at relatively high speed as it moves out of engagement with the set of jaws at the forward end of said second part of said path.

21. Apparatus as set forth in claim 1 wherein the mounting means for each unit comprises means for frictional driving of the units by the conveyor, said frictional drive mean enabling slippage between the units and the conveyor as the units are retarded.

22. Apparatus as set forth in claim 21 wherein the mounting means for each unit further comprises means for positively coupling the units to the conveyor for positively driving the units by the conveyor at the speed of the conveyor in the first part of said endless path, said coupling means being released in response to engagement of the unit with said retarding means.

* * * * *